(12) United States Patent
Weissenberg et al.

(10) Patent No.: US 6,368,511 B1
(45) Date of Patent: Apr. 9, 2002

(54) CONDITIONING METHOD FOR DEHYDRATING CLARIFICATION SLUDGE

(75) Inventors: Heinz-Günther Weissenberg, Leverkusen (DE); Thomas Melin, Vaals (NL); Bernhard Vosteen, Köln; Joachim Lemke, Wuppertal, both of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/600,537

(22) PCT Filed: Jan. 12, 1999

(86) PCT No.: PCT/EP99/00135

§ 371 Date: Jul. 18, 2000

§ 102(e) Date: Jul. 18, 2000

(87) PCT Pub. No.: WO99/37585

PCT Pub. Date: Jul. 29, 1999

(30) Foreign Application Priority Data

Jan. 22, 1998 (DE) .......................... 198 02 238

(51) Int. Cl.$^7$ .................................. C02F 1/72
(52) U.S. Cl. ...................... 210/759; 210/743; 210/754
(58) Field of Search .................. 210/721, 723, 210/724, 726, 739, 743, 759, 754

(56) References Cited

U.S. PATENT DOCUMENTS

| | | | |
|---|---|---|---|
| 4,221,661 A | * | 9/1980 | Shimizu et al. |
| 4,377,486 A | * | 3/1983 | Barrick et al. |
| 4,671,882 A | * | 6/1987 | Douglas et al. |
| 4,675,114 A | * | 6/1987 | Zagyvai et al. |

FOREIGN PATENT DOCUMENTS

| | | | |
|---|---|---|---|
| DE | 0022525 | | 1/1981 |
| DE | 0484268 | | 5/1992 |
| EP | 91630076 | * | 5/1992 |
| LU | 81671 | | 4/1981 |

OTHER PUBLICATIONS

*Patent Abstracts of Japan, vol. 006, No. 063 (C–099), Apr. 22, 1982, & JP 57 004300 A (Ebara Infilco Co Ltd), Jan. 9, 1982, See Abstract.

*Patent Abstracts of Japan, vol. 004, No. 151 (C–028), Oct. 23, 1980, & JP 55 094698 A (Tsukishima Kikai Co Ltd), Jul. 18, 1980, See Abstract Trib. Cebedeau. vol. 33, No. 444 (month unavailable) 1980, pp. 469–477, J. Hermia et al, La filtrabilité de boues urbaines conditionnées au peroxyde d'hydrogéne.

(List continued on next page.)

Primary Examiner—Betsey Morrison Hoey
(74) Attorney, Agent, or Firm—Joseph C. Gil; Richard E. L. Henderson; Diderico van Eyl

(57) ABSTRACT

A process is described for dewatering sewage sludge consisting of the combination of an acidic oxidative preconditioning with an inorganic post-conditioning, in which case the preconditioning comprises an acidification of the sewage sludge and a catalytic partial oxidation by addition of a substoichiometric amount of hydrogen peroxide and iron ions at a $pH \leq 5$ and then an inorganic post-conditioning is carried out in which the acidified and partially oxidized sewage sludge is admixed with alkaline earth, and in which case, in the inorganic post-conditioning, sufficient calcium hydroxide ($Ca(OH)_2$) is supplied so that the pH of the limed sewage sludge is in the range from at least 9 to at most 11, in order thereafter to dewater the conditioned sewage sludge mechanically.

12 Claims, 3 Drawing Sheets

OTHER PUBLICATIONS

Figure 1:
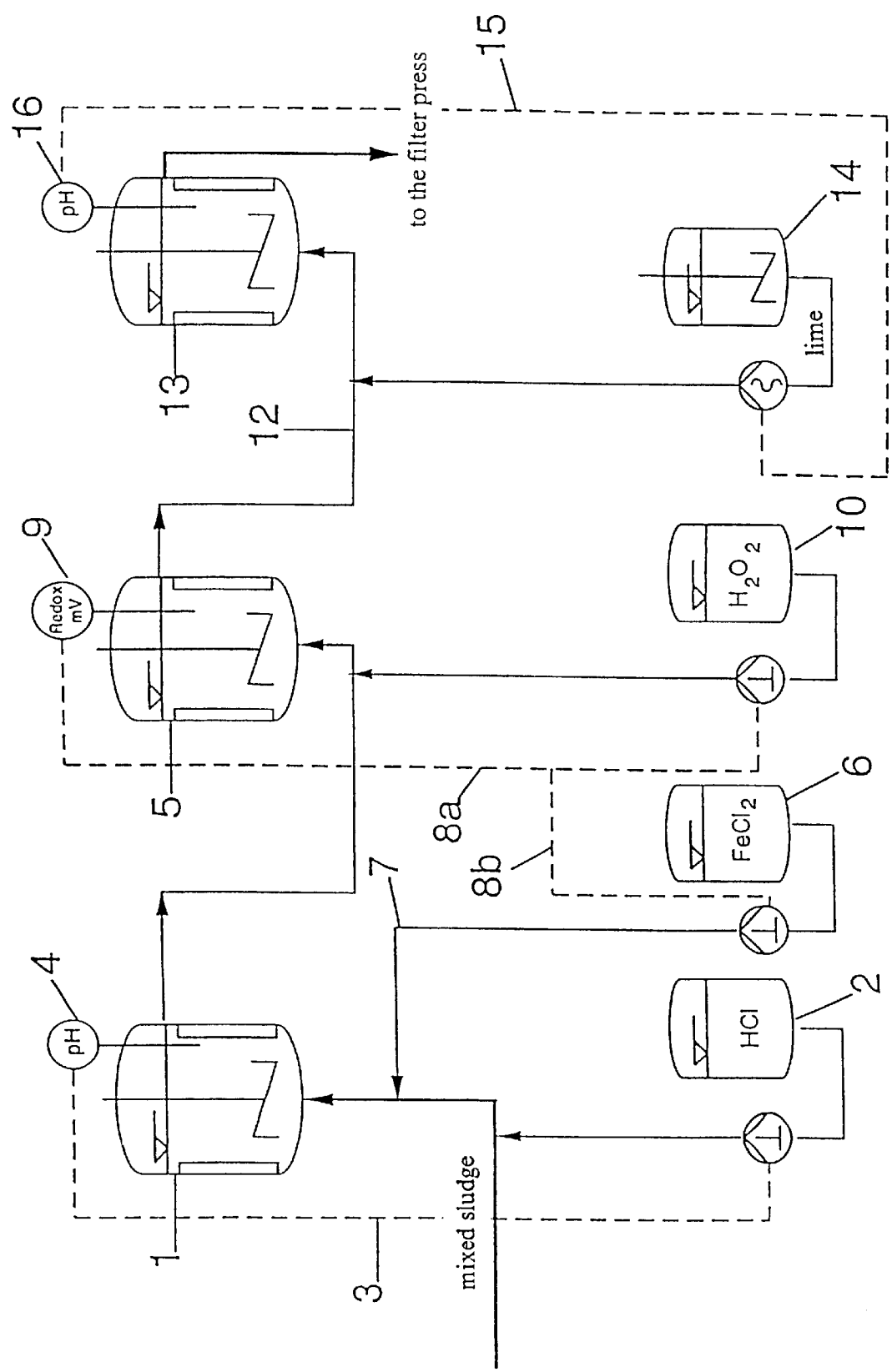

3rd GVC Congress on Oct. 14–16, 1996 in Wurzburg: "Verfahrenstechnik der Abwasser–und Schlammbehandlung" [Process engineering of wastewater and sludge treatment], vol. 1–3 publisher: GVC VDI–Gesellschaft Verfahrenstechnik und Chemieingenierurwesen, Postfach 101139, D–40002 Dusseldorf.

Water Sci. Techn., vol. 28, No. 1 (month unavailable) 1993, pp. 213–221, A. Mustranta et al, "Dewatering of Activated Sludge By An Oxidation Treatment".

Water Sci. Tech., vol. 28, No. 1 (Month unavailable) 1993, pp. 193–201, J. Pere et al, "Characterization and Dewatering of Activated Sludge from the Pulp and Paper Industry".

* cited by examiner

CONDITIONING METHOD FOR DEHYDRATING CLARIFICATION SLUDGE

BACKGROUND OF THE INVENTION

Industrial and municipal wastewater treatment produce large amounts of sewage sludges, generally as a mixture of "primary sludge" (PS) and "secondary sludge" (surplus activated sludge SAS). The sludges, to reduce/utilize the organic sludge fraction, are in part subjected to a digestion and even after their thickening are present as very high-water-content raw sludges having low dry matter contents of, for example, only 4 to 5% by weight. In Germany this involves annually approximately 80 million tons of raw sludges, equivalent to approximately 3.6 million tons of dry matter per year.

The invention is directed at a considerable improvement in dewatering of industrial and municipal sewage sludges and relates especially to a novel process for sewage sludge conditioning as an important process step prior to actual sewage sludge dewatering.

Each sewage sludge conditioning treatment, such as the conventional organic conditioning with polyelectrolytes or else the conventional inorganic conditioning with lime, is intended to ensure or improve the dewaterability of the sewage sludges (which are still rich in organics even after digestion), since without a specific conditioning they would be difficult to dewater. The purpose of the invention is a novel sewage sludge conditioning which leads to a considerable improvement in the subsequent sewage sludge dewatering.

Every current sludge treatment has the purpose of utilization or elimination and generally proceeds via the processing substeps of flocculation/thickening, sludge reduction (for example digestion, hydrolysis) and/or—directly—flocculation/thickening, conditioning, dewatering, drying and incineration. Sewage sludge incineration plants generally include the residual drying which is still required of the mechanically dewatered sewage sludge (for example fluidized-bed furnaces and multiple hearth furnaces). The final purpose of sludge treatment is, according to the German Technical Regulations on Waste, generally sewage sludge mineralization by incineration.

Critical factors in the overall costs of sewage sludge mineralization by incineration are, in addition to the costs of the other upstream stages, the incineration costs. If it were to be possible to reduce considerably the water load on the sewage sludge, these could be correspondingly reduced both with respect to capital costs (for example smaller plant size) and also with respect to operating costs (for example reduced consumption of auxiliary fuel).

The purpose of much current work on conditioning with respect to dewatering and on dewatering itself is a sludge which is dewatered as highly as possible (see, for example, [1]). A main starting point for improvements of mechanical dewatering is still the upstream conditioning of the sludges high in organics. The conditioning must be precisely matched to the sludge present in the individual case itself and at the same time to the dewatering technique employed (for example decanters, fire filter presses, chamber filter presses, membrane filter presses).

Conventional conditioning is preferably carried out using organic conditioning aids, for example polyelectrolytes (PE), but not rarely also using inorganic conditioning aids such as slaked lime and/or other substances promoting dewatering, for example pulverized coal or fly ash from coal combustion.

Especially in the case of inorganic conditioning, the amount of sludge dry matter originally present (SDMo) is noticeably increased by the amount of conditioning aids added (CA) to the higher amount of dry matter then present SDM+=SDMo+CA. The CA load of the original sludge dry matter yCA (as the ratio CA/SDMo) is set, for example, to values of 0.25 kg of CA/kg of SDMo, frequently even substantially higher. This increase in the amount of original sludge dry matter by 25% or more is a reason (but not necessarily a valid one) for organic conditioning using PE frequently having been preferred recently to inorganic conditioning.

In addition to the described organic or inorganic conditioning, even earlier, other possible methods for sludge conditioning have been investigated. One of the investigated possible methods relates to oxidative partial degradation of organic sludge components, in particular the "slimy microbial sludge fractions", which obviously greatly impede sludge dewatering. Such oxidative treatment of sewage sludges based on the Fenton reagent (hydrogen peroxide $H_2O_2$ and divalent iron ions $Fe^{++}$ as catalyst, added, for example in the form of $FeCl_2$) or based on ozone are the subject of extensive work which also considers ancillary questions such as AOX degradation or odour reduction (as a specific partial degradation).

A substantial part of the prior art on $H_2O_2$ conditioning is described in summary in [2]. Despite many studies (cf., for example, [3], [4], [5]), although using $H_2O_2$ conditioning the dewatering results achieved on various dewatering machines were somewhat improved, the improvement was not substantial, that is to say the dewatering results, in our opinion, were still unsatisfactory.

The dewatering result is usually described by the dry matter content achieved DM+(% by weight), i.e. the ratio DM+=water/(water+SDM+), which also includes the conditioning aid CA added in variable amounts in the inorganic conditioning (SDM+=SDMo+CA). What is termed the water loading $yH_2O$ of the original sludge dry matter, that is to say the ratio $yH_2O$=water/SDMo appears far more suitable for engineering evaluation of dewatering.

Conditioning not only has a beneficial effect on the extent of the degree of dewatering achieved, but also on the dewatering rate (e.g. filtration times, pressing times) and thus the output of a dewatering machine used.

The effect of an oxidative conditioning on sewage sludge dewatering in, for example, belt filter presses and chamber filter presses which is beneficial in trend, especially of acidic oxidative conditioning using the Fenton reagent, is therefore known in principle. However, contrary reports are found, for example relating to the type and amount of the iron catalyst or of corresponding transition metals. From the multiplicity of these studies on the acidic oxidative conditioning of sewage sludges using the Fenton reagent, the procedure in principle and unit operations which participate are substantially known from earlier work:

Acidification proceeds as far as starting pHs of from 3 to 4.

Preferably, $H_2O_2/Fe^{++}$ molar ratios $\leq 5:1$ are employed.

Most frequently, the cheaply available $Fe(II)SO_4 \cdot 7 H_2O$ (green vitriol) is used, which, however, in the event of a subsequent neutralization with lime, would have the disadvantage of considerable gypsum formation.

The $H_2O_2$ requirement is sludge-dependent; the minimum $H_2O_2$ requirement is 1.0 to 1.5% by weight of $H_2O_2$ (based on SDMo).

The oxidation reaction proceeds somewhat rapidly, as a function of temperature (minimum time required 10 min).

Elevated temperatures (e.g. 60 to 90° C.) which are, however, associated with the disadvantage of considerable residual filtrate pollution for example with COD, BOD, $NH_4^+$, accelerate the oxidation.

In some work, specific post-conditioning was claimed explicitly.

However, the references previously made to post-conditioning are concerned only with:

a) an additional organic PE post-conditioning, with reference frequently being made to the high pressure sensitivity of $H_2O_2$-preconditioned and PE-post-conditioned sludges, and/or b) a "neutralization" as increasing the pH with, for example, NaOH, $Mg(OH)_2$ or $Ca(OH)_2$ back to the vicinity of the neutralization point (avoidance of corrosion) and furthermore to a final pH of a maximum of 8.5, the latter with the aim of rebinding heavy metals which have dissolved in the interim in the previously acidic environment and/or with the aim of decreasing the COD/BOD residual pollution of the later filtrate.

The object underlying the invention is to utilize completely the beneficial effects of acidic oxidative conditioning, which have previously only been partially utilized, in order to improve considerably the dewatering results.

The starting point in the present case was the fact that in an existing sewage sludge incineration plant for industrial sewage sludges, only approximately 60% of the sewage sludge filtercake (previously dewatered on chamber filter presses (CFP) after lime conditioning) was able to be incinerated, whereas according to the German Technical Regulations on Waste, from April 1997 all sewage sludges were to be incinerated. The sewage sludge filtercake dewatered previously on chamber filter presses contained on average approximately 34% by weight of DM+ at a slaked lime loading yCA of about 0.25 to 0.50 kg of CA/kg of SDMo, equivalent to a water load $yH_2O$ of 2.4 to 2.8 kg of $H_2O$/kg of SDMo. The purpose of the development work was therefore roughly to halve the water load in the sewage sludge filtercake and thus approximately double the throughput (t of SDMo/yr) of the existing sewage sludge incineration plant.

DESCRIPTION OF THE INVENTION

The novel process starts from an acidic oxidative preconditioning in which the sewage sludge is initially acidified and then, at a pH≦5 with addition of divalent iron ions ($Fe^{++}$) and a substoichiometric amount of hydrogen peroxide (Fenton reagent), a catalytic partial oxidation takes place; this preconditioning (which is known in principle) is followed according to the novel process by defined post-conditioning with alkaline earths, after which, in the last step, mechanical dewatering takes place. In detail, therefore, apart from modifications described below, use is made of the following process steps which are known in principle:

a) Firstly, the high-organic-content sewage sludge is subjected to an acidic oxidative preconditioning in which the sewage sludge is acidified with HCl and, at a pH<5, catalytic partial oxidation takes place with the addition of divalent iron ions $Fe^{++}$ and a substoichiometric amount of hydrogen peroxide $H_2O_2$.

b) Then an inorganic post-conditioning takes place, in which the acidified and partially oxidized sewage sludge is admixed with alkaline earth, more precisely with elevation of the pH to at least 9.

c) In the last step the sewage sludge thus conditioned is mechanically dewatered using known dewatering apparatuses.

The object is achieved according to the invention, with respect to the above-described process steps, by means of the fact that after an $H_2O_2$ preconditioning, organic post-conditioning with alkaline earth metal oxides takes place, preferably with calcium hydroxide ($Ca(OH)_2$), and in this post-conditioning a pH in the range from at least 9 to at most 11 is set.

The process is advantageously carried out in such a manner that hydrochloric acid is used for the acidification and the addition is set such that the pH of the acidified sewage sludge is between 3 and 4.

The catalyst used for the partial oxidation is preferably an $FeCl_2$ solution which is already added to the acidified and degassed sewage sludge, in which case the amount of $FeCl_2$ added is adjusted within the order of magnitude of 0.75 kg of $FeCl_2$ (100% pure)/kg of $H_2O_2$ (100% strength), equivalent to an $H_2O_2/Fe^{++}$ molar ratio of 5:1, to 1 kg of $FeCl_2$ (100% pure)/kg of $H_2O_2$ (100% strength).

The process is preferably carried out in such a manner that during the partial oxidation sufficient hydrogen peroxide is added so that in the oxidizing sewage sludge a redox potential of 200 mV to 500 mV, preferably from 350 mV to 450 mV, is maintained.

The partial oxidation at pHs of 3 to 4 thus induced proceeds rapidly even at relatively low temperatures in the range from 15° C. to 40° C. and is therefore preferably carried out between 20° C. and 30° C., that is to say elevated temperatures are not necessary.

A preferred procedure of the process is, further, that during the inorganic post-conditioning sufficient calcium hydroxide is added so that the pH of the post-conditioned sewage sludge is at a predetermined preset value in the range of at least 9 to at most 11.

According to a further development of the invention, the sewage sludge is acidified in two series-connected vessels, the pH in the second vessel being maintained at a predetermined preset value in the range from 3 to 4, by adjusting the hydrochloric acid addition to the first vessel.

In addition, the partial oxidation can also advantageously be carried out in two series-connected vessels, in which case the redox potential in the second vessel is kept at a predetermined preset value in the range from 200 mV to 500 mV by adjusting the hydrogen peroxide addition to the vessel.

Finally, the inorganic post-conditioning can also advantageously be carried out in two series-connected vessels, in which case the pH in the second vessel is kept at a predetermined preset value in the range from 9 to 11 by adjusting the addition of calcium hydroxide to the first vessel.

By means of the invention the following advantages are achieved:

a) Firstly, the described specific combination of an oxidative preconditioning, in which a partial oxidation of the sewage sludge is performed, with an intensive, i.e. more strongly inorganic, but minimized in lime, post-conditioning leads, with comparably short filtration times as in the case of a pure lime conditioning, to a drastic decrease in the water load to values of, for example, $yH_2O$=1.0 to 1.2 kg of $H_2O$/kg of SDMo. This means—compared with the dewatering results in the case of purely inorganic lime conditioning or organic PE conditioning—a considerable improvement, even with the use of conventional dewatering machines, for example chamber filter presses, high-dewatering-efficiency decanters. Optimum dewatering is achieved on high-dewatering-efficiency dewatering machines, for example membrane filter presses.

b) The lime charging yCA may be considerably decreased (roughly halved), compared with the purely inorganic lime conditioning.

c) By means of the process the original dry matter content is decreased, for example by 20%, (SDM+<SDMo) or only slightly increased (SDM+ approximately equal to SDMo), since during the acidification of the sludges, more carbonate $CO_2$ is frequently expelled than calcium hydroxide is subsequently added.

d) The increased costs due to hydrochloric acid and hydrogen peroxide are substantially compensated for in the procedure of the invention by decreasing the lime consumption, compared with a pure lime conditioning.

The novel process consists of the following individual steps:

acidification of the prethickened raw sludge with HCl with addition of iron chloride solution, sewage sludge degassing ($CO_2$), partial oxidation of the acidified sewage sludge mixture containing added catalyst with hydrogen peroxide as oxidizing agent, lime post-conditioning by adequate pH elevation, dewatering of the thus preconditioned and post-conditioned sewage sludge, preferably using chamber filter presses or membrane filter presses.

The process was studied and tested using various non-digested industrial sewage sludges from two plants both in the laboratory and long-term (3 weeks at 24 h/d) on a completely continuous pilot-plant unit (throughput 70 kg of raw sludge/h) using pilot-plant filter presses (CFP and MFP having a filter area of 0.1 m$^2$) and over 3 weeks daily on a batch-operated pilot-plant-scale operational unit (50 m$^3$ vessels) using an operational press (CFP having a filter area of 120 m$^2$) or a mobile pilot-plant-scale press (CFP and MFP having a filter area of 1.76 m$^2$).

Compared with the conditioning and dewatering processes used hitherto in the two plants, considerably improved dewatering results, a decreased dry matter load and, inter alia, a significant odour reduction were found. Examples of the results achieved on chamber filter presses (CFP) and on membrane filter presses (MFP):

CFP Dewatering of the Raw Sludge LEV (Loss on Ignition Approximately 52%)

a) with conventional lime conditioning: y$H_2O$=2.4 . . . 2.8 kg $H_2O$/kg SDMo b) with conventional PE conditioning: y$H_2O$=2.2 kg $H_2O$/kg SDMo (large-scale works test)

c) with conditioning according to the process: y$H_2O$=1.5 . . . 1.6 kg $H_2O$/kg SDMo MFP Dewatering of Raw Sludge LEV (Loss on Ignition Approximately 52%)

a) with conventional lime conditioning: y$H_2O$=1.7 kg $H_2O$/kg SDMo b) with conditioning according to the process: y$H_2O$=1.1 . . . 1.3 kg $H_2O$/kg SDMo CFP Dewatering of Raw Sludge DOR (Loss on Ignition Approximately 70%)

a) with lime conditioning (reduced chamber depth): y$H_2O$=2 kg $H_2O$/kg SDMo

MFP Dewatering of Raw Sludge DOR (Loss on Ignition Approximately 70%)

a) with conditioning according to the process: y$H_2O$=1.2 kg $H_2O$/kg SDMo

The high efficiency of the process is due in part to the dissolution of the carbonates present in the sludge, in part to the oxidated lysis of bacterial cells and in part to the dissolution of slimy gel structures which otherwise make the filtration highly difficult, but not least, however, to the combination of the acidic oxidation preconditioning which is known in principle with the defined lime post-conditioning as an additional dewatering aid.

Finally, the multistage arrangement and control of the process is also critical, in the sense of carrying out each of the partial steps completely.

A maximum increase in the dewatering result is achieved when membrane filter presses are used.

The complete process, in its optimum form, consists of the following steps:

1. Prethickening

Prethickening, which belongs to the customary prior art, in thickeners, separators or strainers, to dry matter contents around or above 50 g/l is advisable in order to keep the suspension volumes treated small. The use of polymeric flocculents in this step should be restricted to a minimum, since the following steps are influenced as a result.

2. pH Reduction to pH=3 to 4 by Acidification

Hydrochloric acid (HCl) is used for the acidification, instead of the otherwise customary sulphuric acid, in order to avoid subsequent gypsum precipitation. The acid consumption depends on the carbonate and hydroxide content of the raw sludge. For a typical industrial raw sludge, approximately 100 g of 100% strength HCl is required per kg of SDMo. At a higher carbonate content, approximately 120 to 105 g of 100% strength HCl are needed per kg of SDMo. In an industrial plant, the HCl should be added to the piping upstream of the vessel(s) required for pH adjustment in the acidification, in order to facilitate subsequent $CO_2$ degassing. The residence time required for homogenization and sufficient carbonate dissolution is, in the case of a narrow residence time spectrum, about 20 min. For pH control, a vessel cascade circuit, which has a sufficient inertia, has proven itself here, as it has downstream of the peroxide addition. For the HCl addition, no measurement of dry matter loading is necessary. Instead of this pH control is sufficient.

3. Outgassing

In order to ensure that during the later lime post-conditioning, calcium carbonate is not reformed, the $CO_2$ released during the acidification must be removed from the suspension as completely as possible. For this purpose, degassing ports are provided or separate degassing apparatuses (for example a degassing cyclone in piping system) are used, with which a substantial degassing takes place.

4. Addition of the Catalyst in the Form of an $FeCl_2$ Solution

The required amount of $Fe^{++}$ is equivalent in order of magnitude to the addition of 0.75 kg of $FeCl_2$ (100% pure)/kg of $H_2O_2$ (100% strength), corresponding to an $H_2O_2/Fe^{++}$ molar ratio of 5:1. The addition is performed during the acidification. The dosage rate can be made proportional to the controlled hydrogen peroxide dosage rate, so that no separate measurement or control is necessary.

5. Hydrogen Peroxide Addition

Approximately 1.5% of hydrogen peroxide are required, based on the incoming SDMo loading. When the reaction is carried out in a two-vessel cascade having 20 min residence time/vessel, it has been found that a stable redox value occurs at the outlet and that this can be used to control the amount of peroxide added. Measurement of the SDMo loading in the feed is not required here either. Even in the event of great variations in sludge feed concentration (g of SDMo/l) and sludge origin (SAS/PS ratio), owing to the control on the basis of redox potential, addition of peroxide in proportion to SDMo loading results automatically.

If only one vessel is used, then residence times of the order of magnitude of 2 h per vessel are required (instead of 2×20 min), in order to allow the reactions to proceed to completion.

6. Lime Addition

In the subsequent elevation of pH to from 9 to 11, yCA=0.1 to 0.12 kg of Ca(OH)$_2$/kg of SDMo are required, that is substantially less than in the case of pure conventional lime conditioning (yCA≧0.25 kg of Ca(OH)$_2$/kg of SDMo). The lime is added under pH control. In this pH control, account must be taken of the fact that the pH is not established until after some residence time. In the pilot-plant unit, in the first stage of the two-stage liming, a control pH of 10 was used.

For the industrial solution, the sludge buffer required upstream of the dewatering replaces the second stirred tank.

7. Dewatering

For the mechanical dewatering, in the test of the process both chamber filter presses and membrane filter presses were used. It has been found that the sludge conditioned according to the process described is considerably less pressure-sensitive than sludges conventionally post-flocculated with polymer. This applies not only to the direct effect of shear stresses in pumps and piping (low sensitivity with respect to flock size) but also to the pressure programme during filtration (steeper pressure ramp possible).

The use of membrane presses leads to higher dry matter contents or lower water loadings yH$_2$O in the filtercake and to shorter and chiefly more accurately reproducible filtration times.

It is essential here that the acidic oxidative preconditioning proceeds under the following optimized conditions:

a) Clear separation of acidification and oxidative reaction with H$_2$O$_2$, in which case the divalent iron can be added (preferably as FeCl$_2$) as early as the acidification. Such a separation must at the same time include the provision of sufficient residence times in each case.

b) Maintenance of a pH of 3 to 4 during the oxidative partial reaction, that is to say appropriate decrease of the pH in advance by acidification with HCl to values<4, the pH decreasing still somewhat further by the addition of FeCl$_2$.

c) Maintenance of a sludge-dependant optimum H$_2$O$_2$ loading of, for example, 0.015 kg of H$_2$O$_2$/kg of SDMo (at a relatively low SAS content in the raw sludge) up to 0.080 kg of H$_2$O$_2$/kg of SDMo (in the case of high-SAS raw sludges). This H$_2$O$_2$ loading is established by maintaining a sludge-dependant optimum redox potential of 200 to 300 mV at relatively low SAS contents in the raw sludge or up to 500 mV in the case of SAS-rich raw sludges.

e) Choice of an optimum molar ratio H$_2$O$_2$/Fe$^{++}$ of e.g. 5:1.

Surprisingly, the good dewatering results on raw sludges were achieved at temperatures of 20 to 30° C., that is to say without a separate temperature increase of the oxidative reaction. The temperature increase of the oxidation stage to markedly higher temperatures, which was considered necessary in the earlier studies (cf. [2]), is not necessary.

In addition, it has surprisingly been found that in the case of a high-organic sewage sludge having loss on ignition around 70% (high SAS content) comparably good, sometimes even better, dewatering results were achieved as in the case of a sewage sludge having losses on ignition around 50% (lower SAS content). According to experience, the dewatering results with conventional conditioning are generally considerably poorer the greater the loss on ignition and thus the organics content of the sludges. In contrast, in the case of a conditioning according to the process of the invention, even high-organic sludges can be dewatered optimally. The reason is that with the oxidative conditioning essentially only the microbial SAS fraction is changed, in that its "slime coatings" are destroyed by oxidation; therefore, the higher the SAS content, the more effective the oxidative partial degradation can prove (comparatively).

The positive partial effect of the oxidative partial degradation ("destruction of slime coatings") is finally, that is to say during the dewatering, only completely utilizable with respect to degree of dewatering and dewatering rate if sufficient inorganic lime post-conditioning is also performed.

When the preconditioning was carried out stepwise in batch reactors or in a multistage self-controlling manner as a throughflow process through a multistage Konti plant, it was surprising that the oxidation reaction, which is rapid even at room temperature according to the literature, nevertheless had a marked time requirement and therefore not only the mean residence time is of importance, but obviously also a sufficiently narrow residence time distribution. This experience led to the (at least) two-stage implementation of the actual oxidation with presetting of the sludge-specific redox potential in the second vessel as a reference value for the controller preset value in the first vessel.

Similar experience argues for an (at least) two-stage arrangement of the upstream acidification using HCl with presetting of the sludge-specific final pH of the second vessel as a reference value for the controller preset value in the first vessel.

The process of the invention is suitable especially for dewatering high-organic sludges, in particular for dewatering sewage sludges having average and relatively high microbial sludge contents or for sludges having sludge contents of other animal origin (for example gelatin-containing sludges).

The principal field of application is in the broad sector of sewage sludges from industrial and municipal wastewater treatment by means of aerobic and/or anaerobic treatment stages.

REFERENCES

[1] 3rd GVC Congress on Oct. 14–16, 1996 in Würzburg: "Verfahrenstechnik der Abwasser- und Schlammbehandlung" [Process engineering of wastewater and sludge treatment], Volume 1–3 publisher: GVC VDI-Gesellschaft Verfahrenstechnik und Chemieingenieurwesen, Postfach 101139, D-40002 Düsseldorf

[2] Patent DE 2838386 C2: "Verfahren zur Entwässerung von organischem Schlamm" [Process for dewatering organic sludge] Kurita Water Industries Ltd., Osaka/JP (Laid-open 3.1.1980)

[3] J. Pere, R. Alen, L. Viikari, L. Erikson "Characterisation and Dewatering of Activated Sludge from the Pulp and Paper Industry", Water Sci. Tech., Volume 28, No. 1 (1993), pp. 193–201

[4] A. Mustranta, L. Viikari "Dewatering of Activated Sludge by an Oxidative Treatment", Water Sci. Techn., Volume 28, No. 1 (1993), pp. 213–221

[5] J. Hermia, G. Gahier, E. Tamagniau, J. P. Wenseleers "La filtrabilitè de boues urbaines condittionèes au peroxyde d'hydroène", Tri. Cebedeau, Volume 33, No. 444 (1980), pp. 469–477

EXAMPLES

Figure 2:
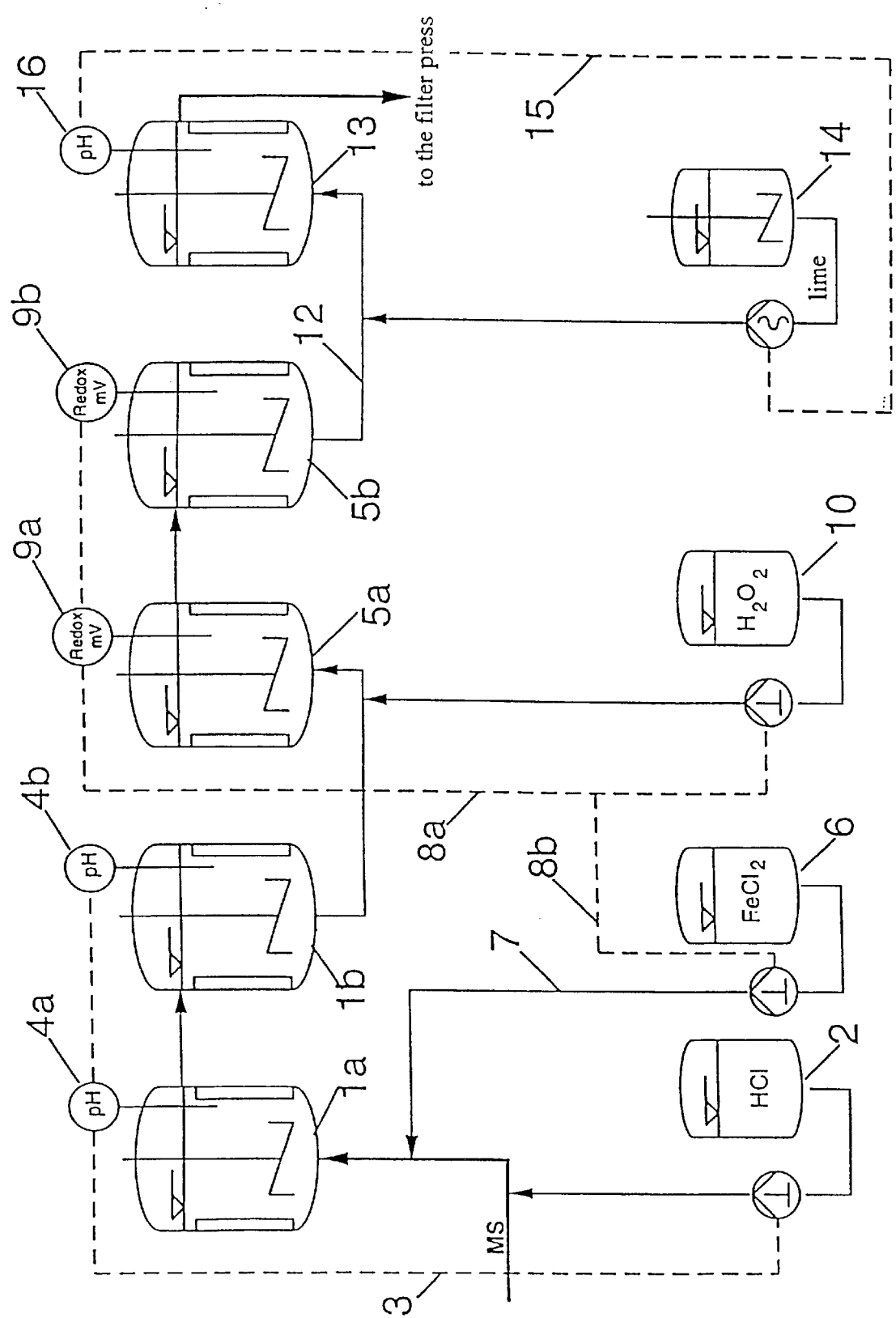
Figure 3:
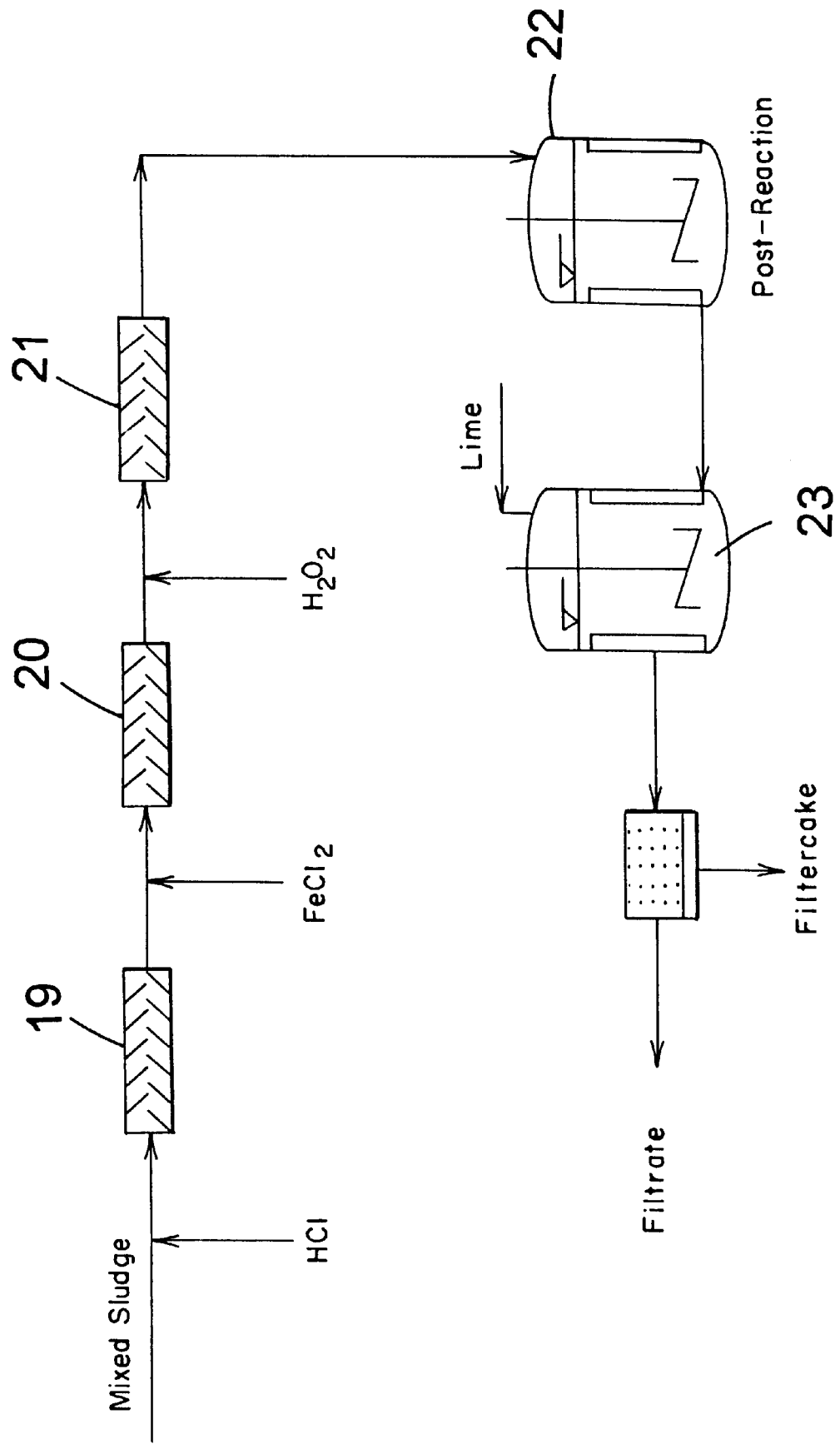

The invention will be described in more detail below with reference to the example of fully continuous plants for high sludge throughputs. In the figures:

FIG. 1 shows a diagrammatic flow chart of a plant having only one mixing vessel in each case in the acidification, oxidation and lime post-conditioning, FIG. 2 shows a diagrammatic flow chart of a plant having in each case two series-connected mixing vessels in the acidification and oxidation, FIG. 3 shows a schematic drawing of a possible plant modification using static mixers for the acidification and the (starting) oxidation and otherwise having only one mixing vessel for the (remaining) oxidation and for the lime conditioning.

In FIGS. 1 and 2, degassing ports on the vessels for conducting away the carbonate $CO_2$ released in the acidification have not been shown separately. Correspondingly, in FIG. 3, the depiction of a degassing cyclone in the pipe mixer system outline has been omitted.

The mean residence time in the individual vessels in a process arrangement according to FIG. 1 is in each case approximately 2 h. According to FIG. 1, the raw sludge which has been thickened in advance (termed mixed sludge, consisting of PS and SAS, of, for example, 50 g of SDMo/kg of raw sludge) is fed continuously at a rate of 100 t/h (equivalent to 5 t of SDMo/h) to the stirred vessel 1 in which the acidification with HCl is performed. For this purpose, technical-grade hydrochloric acid of 30% by weight HCl is added continuously from the HCl tank 2 to the influent mixed sludge. The dosage rate is set using the pH-dependant controller 3 so that in the vessel 1 a pH of 4, measured with the pH electrode 4, is maintained. The HCl stream added under automatic control for this is approximately 1500 kg of 30% strength HCl/h. In the reaction vessel 5, the $Fe^{++}$-catalysed partial oxidation of the acidified sewage sludge by $H_2O_2$ from the $H_2O_2$ reservoir 10 takes place. The $H_2O_2$ stream added to the vessel 5 is established under automatic control owing to the controller 8a such that a redox potential of, for example, 350 mV (in the case of a mixed sludge of average SAS content) is maintained in the reaction vessel 5, determined there by the measuring electrode 9. The associated $FeCl_2$ catalyst solution is already added with the raw sludge stream, that is to say upstream of the stirred vessel 1, to the acidification stage, via the line 7 from the $FeCl_2$ reservoir 6. For this purpose, a proportional controller 8a/8b is provided which adjusts the $FeCl_2$ stream in proportion to the added $H_2O_2$ stream. The $H_2O_2$ stream is approximately 150 kg of $H_2O_2$ solution (50% strength)/h. The $FeCl_2$ stream is approximately 280 kg of $FeCl_2$ solution (20% strength)/h. The oxidation in the reaction vessel 5 takes place at atmospheric pressure (1 bar) at a temperature of 20 to 30° C.

The partially oxidized sewage sludge leaves the reaction vessel 5 via the line 12 and is then fed to the vessel 13 for the lime post-conditioning. The lime addition to line 12 takes place from the slaked lime reservoir 14 using a pH-dependant controller 15, as a result of which a pH>9 (for example pH=10), measured with the pH electrode 16, is maintained in vessel 13. The slaked lime (calcium hydroxide suspension) has a concentration, for example, of 20% by weight of $Ca(OH)_2$. The metering rate of the slaked lime is 3000 kg of $Ca(OH)_2$ suspension/h, equivalent to 600 kg of $Ca(OH)_2$/h.

The SDMo stream discharged from the vessel 13 with the conditioned sewage sludge is, owing to the outgassing, oxidation and solution processes, only approximately 4 t/h. However, the reduction in sludge dry matter (here 20%) is highly sludge-dependant.

The conditioned sludge at approximately 104 t/h is finally passed into filter presses (not shown here) for dewatering. These can be, for example, chamber filter presses or membrane filter presses. The CFP-dewatered sewage sludge filtercake has a dry matter content of approximately 45% by weight. In the case of MFP dewatering, a dry matter content of approximately 48% by weight is achieved.

The conditioning plant according to FIG. 2—also designed for fully continuous operation—comprises, in contrast to the plant according to FIG. 1, two series-connected connected vessels in each case in the acidification and oxidation stages, that is to say the acidification takes place in the two reaction vessels 1a and 1b and the catalytic partial oxidation in the two vessels 5a and 5b. The HCl is added in a similar manner to FIG. 1. In this case the pH in vessel 1b as target variable (pH electrode 4b) governs the ph in vessel 1a (pH electrode 4a) as intermediate variable of the metering pump (in the manner of a cascade controller). The same applies correspondingly to the partial oxidation in vessels 5a and 5b, that is to say the $H_2O_2$ is also added here in a similar manner to FIG. 1. In this case the redox potential in vessel 5b as target variable (measuring electrode 9b) governs the redox potential in vessel 5a (measuring electrode 9a) as intermediate variable of the metering pump. The associated $FeCl_2$ catalyst solution is again fed to the acidification stage (upstream of vessel 1a); it is also metered here in proportion to the $H_2O_2$ stream added under automatic control (proportional controller 8a/8b).

The required mean residence time in vessels 4a and 4b and 5a and 5b is, for a process arrangement according to FIG. 2, only approximately 20 min in each case.

The lime post-conditioning is performed in FIG. 2 as in FIG. 1 in only one large vessel 13 having about 2 h mean residence time. This stage also, if there is no storage vessel before the downstream filter presses, should better consist of two series-connected smaller vessels having appropriate control of the slaked lime addition.

FIG. 3 shows an accordingly modified conditioning plant which, however, is made up in principle in a similar manner to a plant according to FIG. 1. The raw sludge is acidified here not in a vessel, but in a first static mixer 19, and correspondingly also the $FeCl_2$ admixture in a static mixer 20. Hydrogen peroxide is then added and, in the further static mixer 21, mixed with the acidified catalyst-containing sewage sludge, where the partial oxidation begins. The post-reaction vessel 22 serves so that the partial oxidation comes to an end in accordance with the $H_2O_2$ supply provided. The partially oxidized sewage sludge is then admixed with slaked lime in vessel 23 (similar to FIG. 1) and then fed to a dewatering machine. The simplified process variant in the modified embodiment according to FIG. 3, if appropriate without controllers in the individual stages, that is to say if appropriate operated with fixed metering rates, is useful for raw sludges that vary very little in amount and composition (for example SAS/PS ratio).

Although the present invention has been described in detail with reference to certain preferred versions are possible. Therefore, the spirit and scope of the appended claims should not be limited to the description of the versions contained therein.

We claim:

1. Process for dewatering sewage sludge including the combination of an acidic oxidative preconditioning with an inorganic post-conditioning, in which case the preconditioning comprises an acidification of the sewage sludge and a catalytic partial oxidation by addition of a substoichiometric amount of hydrogen peroxide and iron ions at pH≦5 and then an inorganic post-conditioning is carried out in which the acidified and partially oxidized sewage sludge is admixed with alkaline earth metal oxides, wherein in the inorganic post-conditioning, sufficient calcium hydroxide ($Ca(OH)_2$) is supplied so that the pH of the limed sewage sludge is in the range from at least 9 to at most 11, in order thereafter to dewater the conditioned sewage sludge mechanically.

2. Process according to claim 1, wherein hydrochloric acid is used for the acidification and addition of the hydrochloric acid is set such that the pH of the acidified sewage sludge is between 3 and 4.

3. Process according to claim 1, wherein a catalyst used for the partial oxidation is an $FeCl_2$ solution, in which case the amount added is approximately 0.75 kg of $FeCl_2$ (100% pure)/kg of $H_2O_2$ (100% strength) of the amount of peroxide used or more.

4. Process according to claim 1, wherein during the partial oxidation sufficient hydrogen peroxide is added so that in the oxidizing sewage sludge mixture a redox potential of 200 mV to 500 mV is maintained.

5. Process according to claim 1, wherein during the partial oxidation sufficient hydrogen peroxide is added so that in the oxidizing sewage sludge mixture a redox potential of 350 mV to 450 mV is maintained.

6. Process according to claim 1, wherein during the partial oxidation, a pH of 3 to 4 and a temperature of 15° C. to 40° C. is maintained.

7. Process according to claim 1, wherein during the partial oxidation, a pH of 3 to 4 and a temperature of 20° C. to 30° C. is maintained.

8. Process according to claim 1, wherein the addition of calcium hydroxide is controlled in such a manner that in the post-conditioned sewage sludge a pH of a minimum of 9 to a maximum of 11 is present.

9. Process according to claim 1, wherein the acidification is carried out in two sequential vessels (1a; 1b) and the pH in the second vessel (1b) is predetermined as a preset in the range from 3 to 4, in which case HCl is added to the first vessel (1a) whose pH is adjusted as a direct control variable for addition of HCl in the manner of a cascade controller such that the pH in the second vessel (1b) is kept at a predetermined preset value.

10. Process according to claim 1, wherein the oxidative reaction is also carried out in two sequential vessels (5a; 5b) and the redox potential in the second vessel (5b) is kept in the range from 200 mV to 500 mV, in which case the $H_2O_2$ is added to the first vessel (5a), the redox potential of which is adjusted as a direct control variable for the $H_2O_2$ addition in the manner of a cascade controller such that the redox potential in the second vessel (5b) is kept at a predetermined preset value.

11. Process according to claim 1, wherein the inorganic post-conditioning with alkaline earth metal oxides is also carried out in two sequential vessels and the pH in the second vessel is kept in the range from at least 9 to at most 11, in which case the lime is added to the first vessel, the pH of which is adjusted as a direct control variable for the lime addition in the manner of a cascade controller such that the pH in the second vessel is kept at a predetermined preset value.

12. Process according to claim 1, wherein the inorganic post-conditioning with alkaline earth metal oxides is carried out with slaked lime and is also carried out in two sequential vessels and the pH in the second vessel is kept in the range from at least 9 to at most 11, in which case the lime is added to the first vessel, the pH of which is adjusted as a direct control variable for the lime addition in the manner of a cascade controller such that the pH in the second vessel is kept at a predetermined preset value.

* * * * *